United States Patent [19]

Li et al.

[11] Patent Number: 5,332,892
[45] Date of Patent: Jul. 26, 1994

[54] OPTICAL SYSTEMS FOR BAR CODE SCANNERS

[75] Inventors: Yajun Li, Oakdale; Edward Barkan, S. Setauket; David P. Goren, Ronkonkoma; Joseph Katz, Stony Brook, all of N.Y.

[73] Assignee: Symbol Technologies, Inc., Bohemia, N.Y.

[21] Appl. No.: 812,924

[22] Filed: Dec. 24, 1991

Related U.S. Application Data

[63] Continuation-in-part of Ser. No. 735,573, Jul. 25, 1991.

[51] Int. Cl.$^5$ .............................................. G06K 7/10
[52] U.S. Cl. .................................. 235/462; 235/472; 250/568
[58] Field of Search ................. 235/462, 472; 250/568

[56] References Cited

U.S. PATENT DOCUMENTS

| | | |
|---|---|---|
| 3,684,868 | 8/1972 | Christie et al. . |
| 3,727,030 | 4/1973 | McMurtry . |
| 3,758,782 | 9/1973 | Radford et al. . |
| 3,784,794 | 1/1974 | Allais . |
| 3,809,893 | 5/1974 | Dobras ................................ 250/568 |
| 3,916,184 | 10/1975 | Turner et al. . |
| 4,013,893 | 3/1977 | Hertig ................................. 235/462 |
| 4,115,703 | 9/1978 | Dobras ................................ 250/568 |
| 4,143,809 | 3/1979 | Uebbing et al. ...................... 234/462 |
| 4,675,531 | 6/1987 | Clark et al. .......................... 250/568 |
| 5,184,004 | 2/1993 | Ueda et al. ........................... 235/462 |

FOREIGN PATENT DOCUMENTS

| | | |
|---|---|---|
| 4035368A1 | 11/1990 | Fed. Rep. of Germany . |
| 53191 | 2/1990 | Japan .................................... 235/462 |

OTHER PUBLICATIONS

Metlitsky, B., *Laser Bar Code Scanning: A System Design and Analysis Model*, Symbol Technologies publication, Jul. 1990.

*Bar Code System Considerations*, Symbol Technologies, Inc. publication dated Dec. 1989.

"SFH 204 Silicon Four Quadrant Photodiode," Siemens publication (undated), pp. 8–44 and 8–45.

"PBX 48 Differential Photodiode," Siemens publication (undated), pp. 8–20 and 8–21.

Symbol Technologies, Inc., "SDT: New Scanning Data Terminal-Supports Both Bar Code Reading and Manual Data Entry," *Symbol MSI*, Part 789 MX, 1989.

*Primary Examiner*—John Shepperd

[57] ABSTRACT

The invention facilitates operation of a bar code reader over a wider range of working angle, a wider range of distances from the bar code and a wider range of bar code densities. The invention includes improved optics and sensing elements. To provide a wider depth of field the optics associated with the emitter and or the photodetector have two distinct focal points. In the preferred embodiments, the optics and sensing elements and/or the associated circuitry are arranged to provide two channels of data derived form the scanned bar code. The two channels have differing resolutions. Analysis of the data from the two channels provides a single decoded result. As the working angle and density vary at least one of the resolutions will be appropriate for sensing all or most of the bar coded data. The data from the channel producing a valid result can be used, or if neither channel produces a valid result by itself, data from each channel can be analyzed and valid portions of the data from both channels combined to produce the single decoded result.

43 Claims, 10 Drawing Sheets

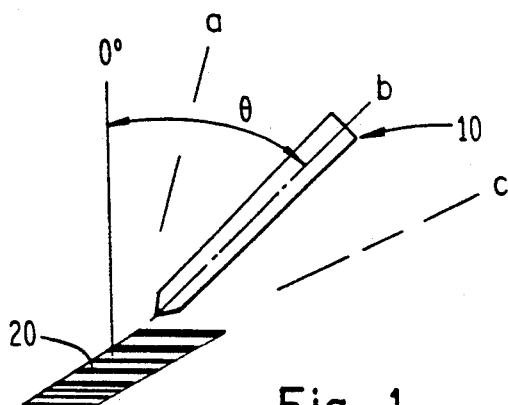
Fig. 1
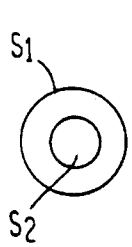
Fig. 2a
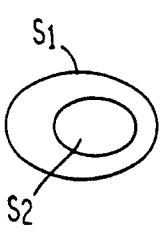
Fig. 2b
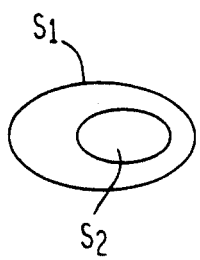
Fig. 2c
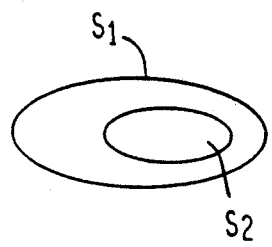
Fig. 2d
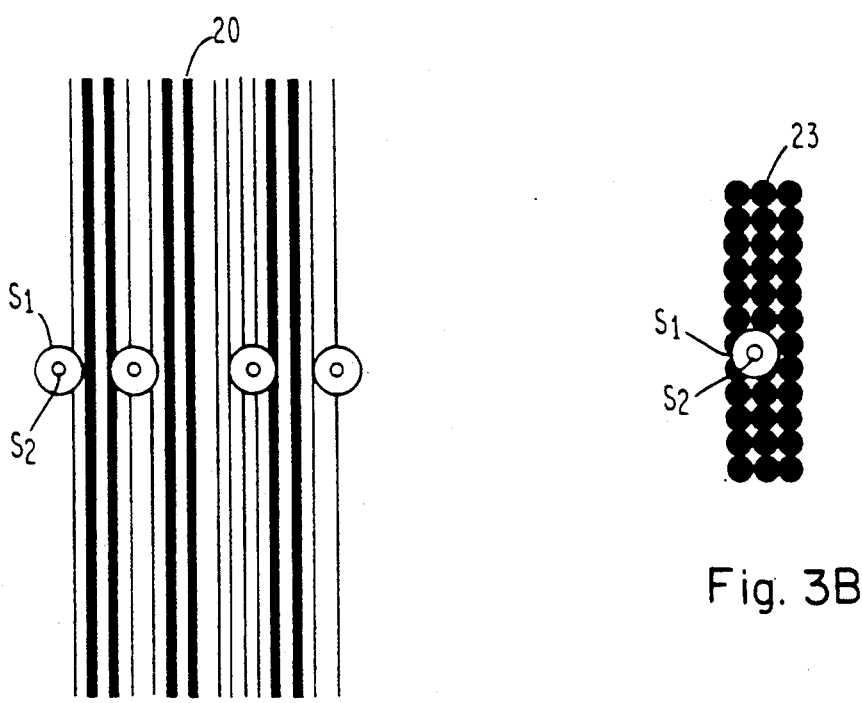
Fig. 3A
Fig. 3B

OPTICAL SYSTEMS FOR BAR CODE SCANNERS

CROSS REFERENCE TO RELATED APPLICATION

This application is a continuation in part of commonly assigned application Ser. No. 07/735,573 filed on Jul. 25, 1991, the disclosure of which is herein incorporated by reference in its entirety.

TECHNICAL FIELD

The instant invention relates to an improved wand or scanner for reading optically encoded information, particularly bar coded data. In particular, the present invention relates to optical systems for the photodetector and the optical emitters of devices used to read optically encoded information, such as bar code labels.

BACKGROUND ART

Optically encoded information, such as bar codes, have become quite common. A bar code symbol consists of a series of light and dark regions, typically in the form of rectangles. The widths of the dark regions, the bars, and/or the widths of the light spaces between the bars indicates the encoded information. A specified number and arrangement of these elements represents a character. Standardized encoding schemes specify the arrangements for each character, the acceptable widths and spacings of the elements the number of characters a symbol may contain or whether symbol length is variable, etc.

To decode a bar code symbol and extract a legitimate message, a bar code reader scans the symbol to produce an analog electrical signal representative of the scanned symbol. A variety of scanning devices are known. The scanner could be a wand type reader including an emitter and a detector fixedly mounted in the wand, in which case the user manually moves the wand across the symbol. Alternatively, an optical scanner scans a light beam such as a laser beam across the symbol, and a detector senses the light reflected from the symbol. In either case, the detector senses reflected light from a spot scanned across the symbol, and the detector provides the analog scan signal representing the encoded information.

A digitizer processes the analog signal to produce a pulse signal where the widths and spacings between the pulses correspond to the widths of the bars and the spacings between the bars. The digitizer serves as an edge detector or waveform shaping circuit, and the threshold value set by the digitizer determines what points of the analog signal represent bar edges. The threshold level effectively defines what portions of a signal the reader will recognize as a bar or a space.

Readers of the type discussed above are single channel systems having a single digitizer output and/or a single processing chain to produce a single digitized output.

The pulse signal from the digitizer is applied to a decoder. The decoder first determines the pulse widths and spacings of the signal from the digitizer. The decoder then analyzes the widths and spacings to find and decode a legitimate bar code message. This includes analysis to recognize legitimate characters and sequences, as defined by the appropriate code standard. This may also include an initial recognition of the particular standard the scanned symbol conforms to. This recognition of the standard is typically referred to as autodiscrimination.

Different bar codes have different information densities and contain a different number of elements in a given area representing different amounts of encoded data. The denser the code, the smaller the elements and spacings. Printing of the denser symbols on an appropriate medium is exacting and thus is more expensive than printing low resolution symbols.

A bar code reader typically will have a specified resolution, often expressed by the size of its effective sensing spot. The resolution of the reader is established by parameters of emitter or the detector, by apertures associated with either the emitter or the detector, by optics which establish the focal length and depth of field of the emitter or detector, by the threshold level of the digitizer, by programming in the decoder, or by a combination of two or more of these elements.

In a laser beam scanner the effective sensing spot may correspond to the size of the beam at the point it impinges on the bar code. In a wand using an LED or the like, the spot size can be the illuminated area, or the spot size can be that portion of the illuminated area from which the detector effectively senses light reflections. By what ever means the spot size is set for a particular reader, the photodetector will effectively average the light detected over the area of the sensing spot.

In one prior art example, U.S. Pat. No. 4,675,531 to Clark et al., an LED illuminates the bar code and images the code onto a photodetector. The aperture of the photodetector determines the resolution or "spot size". In the Clarke et al. system the photodetector effectively averages the light detected over the area of the aperture.

A high resolution reader has a small spot size and can decode high density symbols. The high resolution reader, however, may have trouble accurately reading low density symbols because of the lower quality printing used for such symbols. This is particularly true of dot matrix type printed symbols. The high resolution reader may actually sense dot widths within a bar as individual bar elements. In contrast, a low resolution reader has a large spot size and can decode low density symbols. However, a reader for relatively noisy symbols such as dot matrix symbols reads such a wide spot that two or more fine bars of a high resolution symbol may be within the spot at the same time. Consequently, a reader having a low resolution, compatible with dot matrix symbols can not accurately read high density symbols. Thus any reader having a fixed resolution will be capable of reading bar codes only within a limited range of symbol densities.

For a given symbol density, the resolution of the reader also limits the range of the working angle, i.e. the angle between the axis of the reader and a line normal to of the surface on which the bar code is printed. If the range and resolution are too limited, a user may have difficulty holding the reader, particularly a wand type reader, comfortably while accurately scanning the bar code. This can be particularly troublesome if the wand incorporates particularly troublesome if the wand incorporates additional elements to form an integrated data terminal. The combination of size, weight and an uncomfortable angle can make reading in large amounts of bar code information difficult and annoying, and thereby make the user more resistant to use of the bar code system.

One solution might be to provide some means to adjust the resolution or sensing "spot size" of the reader, e.g., by adjusting the threshold of the digitizer. This approach, however, would require a number of different scans at different resolutions. If the scan is automatic, the variation in resolution causes a loss of robustness because the scan is at the correct resolution only a reduced amount of the time. Effectively such a scanner would scan at the equivalent of a reduced rate. If the reader is a wand type device, the user would have to manually scan the reader across the information each time the resolution changes. This causes a marked reduction in the first read rate and increased frustration for the user.

Another problem is that in applications involving protracted use, a large heavy handheld unit can produce fatigue. When use of the scanner produces fatigue or is in some way inconvenient, the user is reluctant to operate the scanner, which defeats the data gathering purposes for which bar code systems are intended.

Clearly a need exists in the art for a high performance bar code reader which can operate at a wide range of working angles and is capable of reading bar codes over a wide range of symbol densities. Such a reader must be as small and light weight as possible and should be convenient to use in different positions and for long periods of time.

DISCLOSURE OF THE INVENTION

Objectives

The objective of this invention is to provide a high performance bar code reader which is more convenient and efficient to use, particularly by relatively unskilled operators.

One more specific objective of this invention is to derive a larger amount of information from each pass or scan by a single bar code scanner or reader. In particular, an objective of the invention is to use the additional information derived from the single scan to obtain an accurate read by the wand for a wider range of working angles between the wand and a perpendicular to the surface on which the bar code is printed. The wider working angle range allows the unskilled operator to scan the code at whatever angle is most convenient and comfortable yet still obtain a high percentage of successful first reads. The ease of operation this feature provides becomes particularly important when the wand reader incorporates additional elements to form an integrated terminal for processing, storing and displaying the scanned bar code data and data entered by operation of a built in keyboard.

To make the optical scanning type reader more comfortable and convenient to operate, a further objective of this invention is to provide a scanner which is smaller and lighter weight, when held by an operator, and which is easier to manipulate to scan encoded data. In particular, the emitter and detector and all associated optical components should be as light and compact as possible.

Another objective of the invention is to produce an optical scanning type reader system having a large depth of field. This will further the objective of operation at a wide range of angles and will allow the operator to hold the reader at a wider range of distances from the information being scanned.

Another objective of the invention is to use the additional information derived form the scan to read bar codes of a wider range of optical code densities without requiring multiple scans of the information. This allows one improved reader to replace two or more readers previously required, each of which was necessarily designed to read bar codes of a restricted range of bar code density. For a user of relatively low skill this eliminates problems and frustrations of selecting a reader and/or adjusting the sensitivity of the reader to match the density of the particular code the user wants to scan.

SUMMARY

To operate over a wider range of working angle, the invention detects optically encoded information using two effective sensing spots of different diameter. As the angle varies one spot should be sufficiently in focus to provide a valid read, and even if neither is sufficient, information from both spots can often be combined to accurately decode the information. To increase the depth of field, the optical components provide two distinct focal points.

To read a wider range of bar code resolutions, the reader includes two reading channels and derives a single valid decoded result from the scanning data of the two channels. Typically, one channel will have a resolution corresponding to the density of the currently scanned bar code, but if not, valid portions of data from each channel can be combined to provide a single accurate decode result.

In another aspect, the invention consists of an improved emitting and optics assembly for use with a photodetector and optics assembly. The emitting and optics assembly includes a molded optical device having a refractive front surface and an internally reflective surface which cooperate to provide two focal lengths. A light emitter such as an LED wafer is embedded within the molded optical device.

In another aspect, the invention consists of an improved optical emitting and sensing system for emitting light to illuminate optically encoded information and sensing light reflected from the optically encoded information. The system includes an emitter and optics assembly and a photodetector. The emitter and optics assembly comprises a first molded optical device and a light emitting wafer embedded within the molded optical device. The light emitting wafer emits light through the molded optical device to illuminate optically encoded information. The molded optical devices comprises a refractive front surface and an internally reflective surface which cooperate to provide two different focal lengths.

The invention includes a number of different configurations of the molded optical device. In the preferred embodiments, the emitter and optics assembly and the photodetector are aligned along a common optical axis. Optionally, the system may further include a lens and an aperture aligned along the same axis.

The axial alignment of the components in the improved optical emitting and sensing system provides a slim, light weight, reader system, making the reader easier to operate for long periods. The designing of the molded optical device to provide the focusing of the emitted light reduces the dependence on additional lenses, further reduces weight, and makes the construction and alignment of the scanner head simpler. The two focal points provide a large depth of field, which allows use at a wider range of distances from the encoded information and at a wider range of working angles.

The preferred embodiments use an improved multi-channel photodetector which includes a light detecting semiconductor wafer having a first and second active optical sensing areas. The second active optical sensing substantially surrounds the first optical sensing area.

It is within the scope of this invention to use the improved optical emitting and sensing system assemblies in a single channel wand type bar code reader, but in the preferred embodiments the improved optical emitting and sensing system is used in a dual channel system.

The dual channel system embodiments may include the multi-channel photodetector discussed above. The dual channel systems further include means responsive to at least one electrical signal from the optical sensor photodetector for deriving two channels of data for each scan or pass of the encoded information. The two channels of data have two different resolutions, one being higher than the other. A decoder responds to both channels of derived data to produce a single data output representative of the sensed optically encoded information.

The invention encompasses a number of signal processing systems for deriving the two sensing spots and or the two channels of data having differing resolution. For example, in the simplest embodiment, where the wand type reader includes an LED light source and a single photodiode type detector, the detector signal passes through two different signal conditioning circuits and associated digitizers. One signal conditioning circuit and associated digitizer provide a high resolution output, and the other signal conditioning circuit and associated digitizer produce a low resolution output. A microprocessor analyzes the digital data from both channels to decode the scanned bar coded data. The two resolution channels allow reading of dense high resolution bar codes and low resolution bar codes such as those produced by dot matrix printers, with a single pass or scan of a single bar code reader.

Alternatively, in embodiments using the detector wafer having two active sensing areas, the signal from the inner active area represents the high resolution information. The signals from both active areas are summed to produce a signal representing the low resolution information. The signals for the two channels pass through two different signal conditioning circuits and associated digitizers. The digitizers have essentially similar performance characteristics. Because of the different sensing areas used to produce the signals, one digitizer will provide a high resolution output, and the other digitizer will produce a low resolution output. Again, a microprocessor analyzes the digital data from both channels to decode the scanned bar coded data.

Whichever system is used to derive the two channels, the microprocessor can analyze the data from each channel, recognize which produces a valid decode result and select the resultant data derived from that channel as the output data. The channel whose resolution does not match the density of the bar code currently being read would produce a recognizable read error.

Alternatively, the microprocessor can merge the data from the two channels to produce a single valid result, even if neither of the two separate channels would alone produce a valid read. The microprocessor recognizes which portions of the read data from each channel are within acceptable parameters for a read operation of the corresponding resolution. The microprocessor discards any data from the two channels which appears outside the acceptable limits. The microprocessor combines the acceptable portions of the data from the two channels to form the single final valid read result.

A high performance bar code wand should have the following features:
Built-in decoder.
Autodiscrimination of the most popular symbologies.
Large resolution range (from low to high density bar codes, namely 5~20 mil, from well-printed to dot-matrix bar codes).
Easily read over plastic or lamination.

The above technical requirements can be satisfied when the emitter-detector module has a higher depth of field and a variable "spot size." For instance, to read over plastic or lamination, a 2 mm depth of field is usually necessary, and to read dot-matrix bar codes, the required spot size may be as large as 0.5 mm.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIG. 1 is an isometric illustration of a wand type bar code reader embodying the invention during scanning of a bar code.

FIGS. 2a-d show the two effective sensing spots for different working angles of the wand illustrated in FIG. 1.

FIGS. 3A and 3B illustrate scanning of the sensing spots across bar codes. FIG. 3A shows the two effective sensing spots of the invention as they pass over an entire bar code symbol of relatively high density. FIG. 3B shows the two effective sensing spots as they pass over a single bar code element of a low density dot matrix type symbol.

FIG. 13 shows circular areas and a connection to the central area via an insulating channel through the surrounding active area. FIG. 14 shows rectangular areas and use of a bonding pad on the central area with a lead passing above the surrounding active area.

BEST MODE FOR CARRYING OUT THE INVENTION

Figure 4:
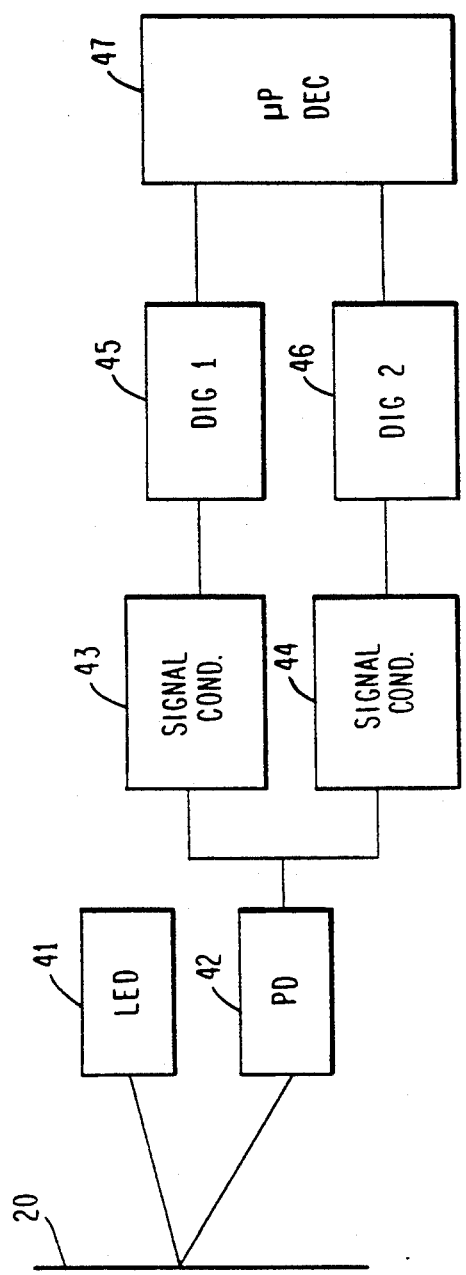
FIG. 4 is a block circuit diagram of one embodiment of the dual channel system which uses different resolution digitizers.

FIGS. 1 and 2 illustrate scanning of a bar code and how the invention serves to increase the range of a working angle $\theta$, particularly for a wand type reader. FIG. 1 shows a wand type bar code reader 10 being manually scanned across bar code 20. As shown in FIG. 1, the working angle $\theta$ is defined as the angle between the major axis of the wand 10 and a line normal to the surface on which the optically encoded information appears. The wand 10 is shown in position b, at which point the angle $\theta$ is approximately 45°. The wand, however, can be held at a wide range of angles, such as at the 0° position or at positions a and c as illustrated in FIG. 1.

The light emitting and detecting elements of the wand 10 are arranged to produce two effective sensing spots $S_1$ and $S_2$, of differing diameters. FIG. 2 shows the different diameters and shapes of the two sensing spots for the different working angles, $\theta$. At the 0° position, both of the sensing spots $S_1$ and $S_2$ are essentially concentric circles. As the angle $\theta$ increases through positions a, b and c, however, the two spots $S_1$ and $S_2$ smear and enlarge to form progressively larger ovals.

If the reader is a wand type device, the user manually moves the wand to scan the two sensing spots across the bar code. This produces (i) a sensing of the optically encoded information as it passes through the first effective sensing spot to produce a first sensing signal, and (ii) a sensing of the optically encoded information as it passes through the second effective sensing spot to produce a second sensing signal.

During a scan of a bar code or other optically encoded information, the first and second sensing spots $S_1$ and $S_2$ are scanned over the optically encoded information. FIG. 3A shows scanning of the spots $S_1$ and $S_2$ across a bar code 20, for a relatively small working angle $\theta$. The user keeps the working angle close to or equal to 0° throughout the length of the scan, and the spots $S_1$ and $S_2$ both remain essentially circular.

If the user changes the working angle, the sizes and shapes of the sensing spots $S_1$ and $S_2$ change in the manner illustrated in FIG. 2. The diameters of the first and second effective sensing spots $S_1$ and $S_2$ increase in proportion to increases in the working angle. The invention derives a single decoded representation of the optically encoded information from the sensing signals derived from scanning the two sensing spots $S_1$ and $S_2$ over the information. For different working angles, at least one of the effective sensing spots will be of appropriate size to produce a valid reading of the optically encoded information.

For a relatively low density code, the 0° working angle may provide a large circular sensing spot $S_1$, as shown at a in FIG. 2, of the appropriate size. The smaller spot $S_2$ may actually be too small for some noisy printed codes, such as dot matrix printed codes. At a slightly larger angle, such as at b, both may provide at least some readable information, which can be merged to provide a single legitimate decode result. As the working angle $\theta$ increases, the spots $S_1$ and $S_2$ elongate, as shown at "c" and "d" in FIG. 2. At a number of the angles, although large spot $S_1$ becomes too large, the smaller spot $S_2$ will have an appropriate diameter.

FIG. 3A shows scanning of the spots $S_1$ and $S_2$ across a relatively high density bar code 20. Because the working angle is close or equal to 0°, the spots $S_1$ and $S_2$ are both essentially circular. At several points of the scan of the high density bar code, particularly at the middle two positions illustrated in the drawing, the larger sensing spot $S_1$ covers two or more elements. The averaging over such an area would not provide an accurate signal indicating the edges of the small bar code elements. The smaller diameter spot $S_2$, however, covers so small an area that even at these positions it covers only one narrow element.

FIG. 3B illustrates scanning of the spots $S_1$ and $S_2$ over one element 23 of a dot matrix bar code. As shown, the element 23 actually exhibits gaps between the individual dots. Sensing using the small spot $S_2$ will detect the dots as dark areas and the gaps as light regions. For example, at the position shown in FIG. 3B, the spot $S_2$ coincides approximately with one of the gaps. As a result, the signal responsive to sensing of spot $S_2$ would, at that point indicate a light space, not a dark bar element. Thus sensing of the spot $S_2$ would not accurately read the width of the element 23. The larger spot $S_1$, however, should produce a legitimate decode result. Sensing using spot $S_1$ averages the reflected light over the larger area of that spot, and consequently would indicate a dark element.

FIG. 4 shows the first embodiment of the dual channel system of the invention, which is the simplest technique for producing the two channels having two different resolutions or sensing spots. This embodiment derives the two different resolutions electronically, by using digitizers having different resolutions. The reader could be an automatic scanner or a wand type device which requires manual scanning. For simplicity the discussion of the circuitry will assume that the reader is a manual scanning type wand.

The embodiment of FIG. 4 has a single light source, light emitting diode or "LED" 41, and a single photodetector, photodiode "PD" 42. The LED 41 emits light to illuminate an area of the surface of the optically encoded information, i.e. bar code 20. The PD 42 senses light reflected from bar code 20 and produces an analog signal the amplitude of which represents the amplitude of reflected light. The reader scans the bar code. If the reader is a wand type unit, the user manually passes the unit over the information such that the detected reflected light varies in amplitude in correspondence with the light and dark regions of the information.

The analog signal from PD 42 is amplified, inverted and conditioned by two analog signal conditioning circuits 43 and 44. The signal conditioning circuits 43 and 44 are essentially identical and thus provide two analog signals output signals. One of these output signals goes to a first digitizer 45, the other to second digitizer 46. The digitizers 45 and 46 serve as edge detectors or wave shaper circuits, in a manner similar to digitizers used in prior art single channel type readers. In each of the digitizers 45 and 46, and the threshold value set by the digitizer determines what points of the analog signal represent bar edges. The digitizers 45 and 46, however, have different threshold values.

Figure 4A:
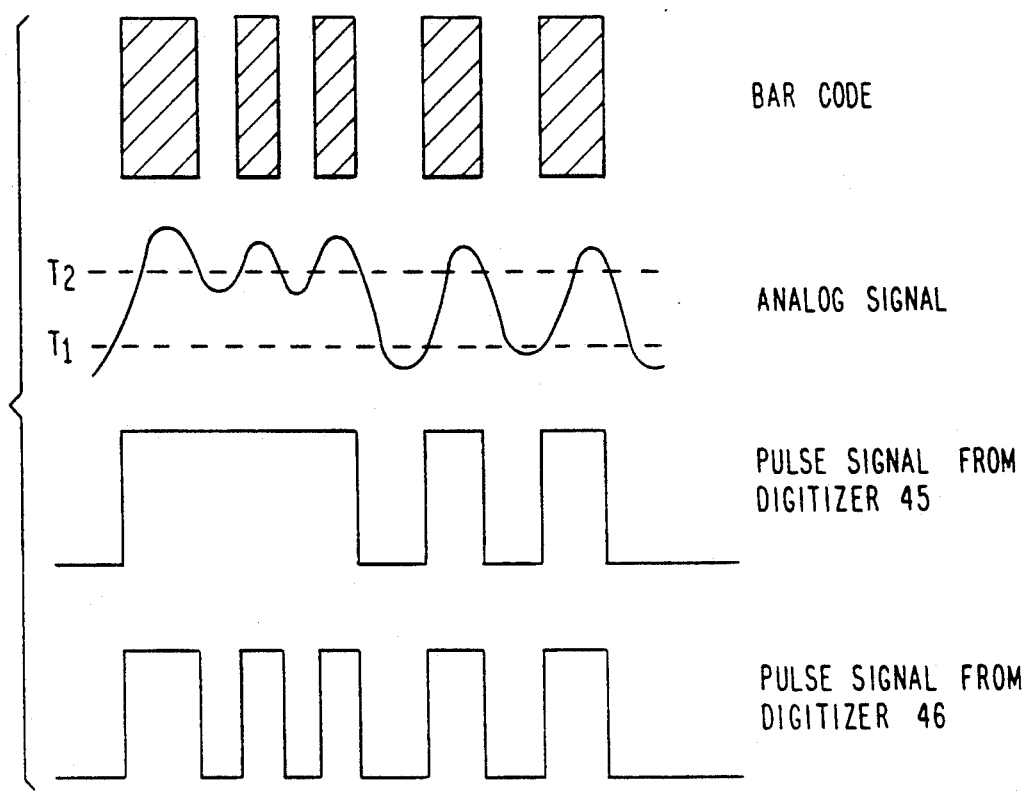
FIG. 4A shows a high resolution bar code and the signals produced in the circuit of FIG. 4 by scanning of such a bar code.
Figure 4B:
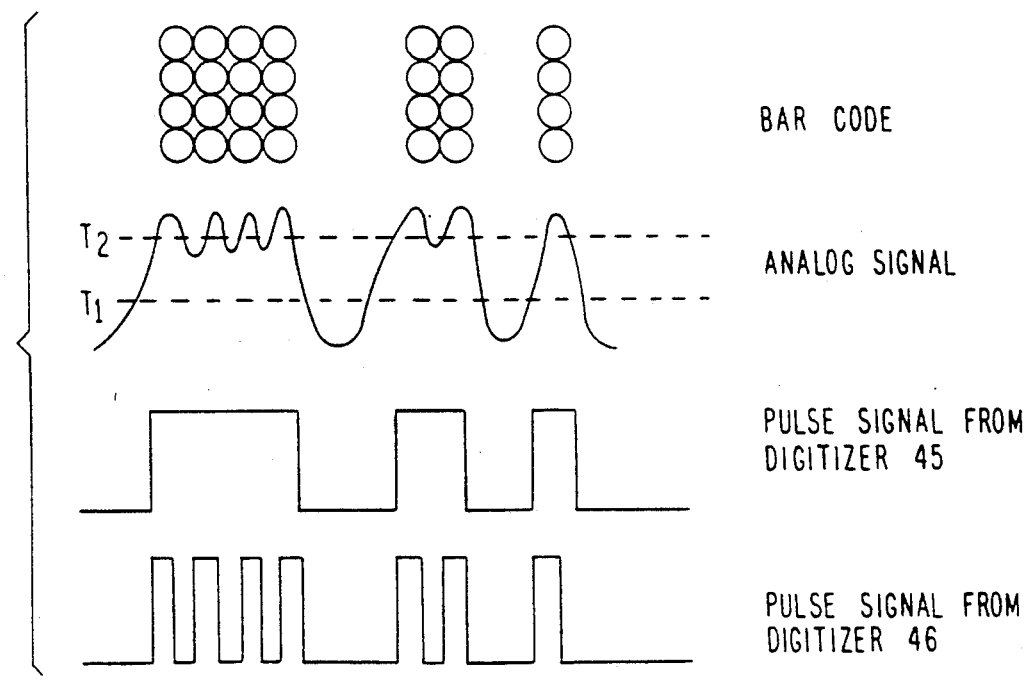
FIG. 4B shows a noisy bar code printed by a dot matrix printer and the signals produced in the circuit of FIG. 4 by scanning of such a bar code.

The pulse signals output from both of the digitizers 45 and 46 are supplied as inputs to a programmed microprocessor type decoder 47. Signal conditioning circuit 43 and digitizer 45 form a first channel providing a first data stream to the decoder 47. Signal conditioning circuit 44 and digitizer 46 form a second channel providing a second data stream to the decoder 47. The threshold of the first digitizer 43 is set relatively low, at $T_1$ as shown in FIGS. 4A and 4B, so that digitizer 43 will have a low resolution. The second digitizer 46 has a high threshold $T_2$ and is sensitive.

FIG. 4A shows a high resolution bar code and the signals produced in the circuit of FIG. 4 by scanning of such a bar code. The analog signal varies with the averaging of the reflected light, and as conditioned, will have small fluctuations corresponding to closely spaced bars. The low threshold in the first digitizer 45 will cause several of the variations to go undetected, as shown by the pulse signal from digitizer 45, in FIG. 4A. The second channel, with its high resolution, will detect small variations in the reflected light caused by the closely spaced bar elements because the sensitive digitizer 46 will pick up the small bumps in the analog signal. The high resolution second channel will produce a pulse train output from digitizer 46, as shown in FIG. 4A, more closely corresponding to the bar code edges.

FIG. 4B shows a low resolution bar code of the dot matrix type and the signals produced in the circuit of FIG. 4 by scanning of such a bar code. The analog signal varies with the averaging of the reflected light, and as conditioned, will have small fluctuations corresponding to dots of the matrix. The analog signal will have larger fluctuations corresponding to the actual elements of the symbol. The low threshold in the first digitizer 45 will cause smaller fluctuations of the analog signal to go undetected, as shown by the pulse signal from digitizer 45, in FIG. 4B. The low resolution first channel will produce a pulse train output from digitizer 45 closely corresponding to the bar code edges. In contrast, the second channel, with its high resolution, will detect the small variations in the reflected light caused by the spaced dots within the bar elements because the sensitive digitizer 46 will pick up the small bumps in the analog signal. The pulse signal from digitizer 46, as shown in FIG. 4B, will not correspond to the actual edges of the bar elements.

It should be apparent from FIGS. 4A and 4B that for either high resolution bar code or low resolution bar code, one of the two channels will produce a pulse signal output or data steam closely corresponding to the edges of the scanned bar code. The decoder 47 is a relatively standard unit, with the exception that it has a two inputs, instead of one, for the two data steams for the two different resolution channels. The integrated decoder 47 provides a digital data output, for example in ASCII format. The specific decoding will be discussed in more detail later, particularly with respect to FIGS. 15 and 16.

A wide variety of techniques can be used for deriving the two data channels. In each embodiment, however, the system would provide two data steams from the two different resolution channels to the single decoder 47. The decoder 47 remains the same.

FIGS. 5 to 10 illustrate various preferred embodiments of the optical systems for the improved reader, particularly when the reader is constructed in the form of a wand type device. Both traditional and non-traditional optical components are employed in the construction of optical devices for the hand-held scanners or wands to read optically encoded information, particularly the bar code data. By axially aligning the emitter and detector and their associated optics, the wand can be particularly small and narrow and therefore easy for a user to hold and manipulate.

Figure 5:
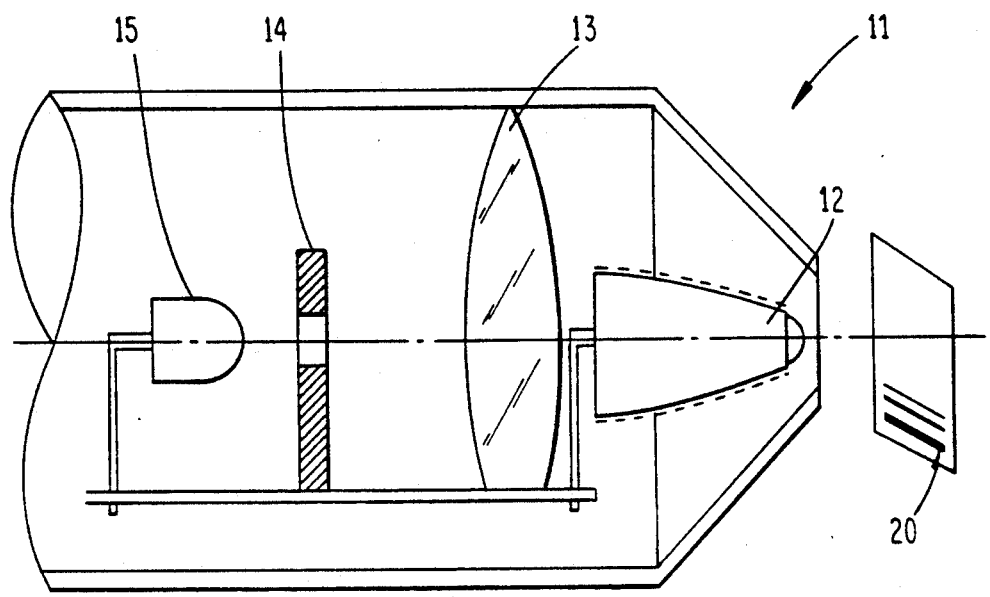
FIG. 5 illustrates the optical emitting and sensing system of the invention in cross section.

FIG. 5 shows a cross sectional view of the first embodiment of the optics of the present invention. As shown in this drawing, the optical emitting and sensing system 11 for optically reading encoded information comprises essentially four axially aligned components, and LED emitter and optics assembly 12, a condenser lens 13 behind assembly 12, a photodetector 15 and an aperture 14 between lens 13 and photodetector 15.

An LED wafer within the LED emitter and optics assembly 12 serves as the LED 41 in the circuit of FIG. 4. A bar code symbol 20 is illuminated by the light from the LED emitter and optics assembly 12. The lens 13 collects the back scattering light, reflected from bar code symbol 20, and focuses that light onto the aperture 14. The aperture 14 limits the size of the field of view and the resolution of the system. The photodetector assembly 15 is placed behind the aperture 14.

The photodetector and optics assembly 15 can be an ordinary detector wafer with one active area in a molded plastic optical device. The detector assembly 15 serves as the photodetector 42 in the circuit of FIG. 4 for the single detector type bar code wands. Alternatively, photodetector 15 may use a detector wafer with two active areas, as will b e described later with respect to FIGS. 11 to 14.

Figure 6:
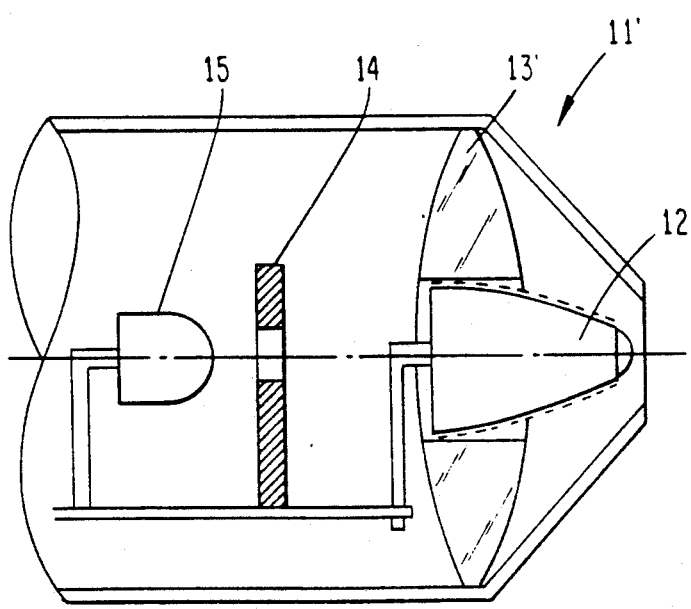
FIG. 6 illustrates in cross section a modified form of the optical emitting and sensing system of the invention using an annular lens around the emitter and optics assembly.

FIG. 6 illustrates another embodiment of the optics of this invention, similar to that shown in FIG. 5. The optical emitting and sensing system 11' illustrated in FIG. 3, however, provides a more compact structure. In this embodiment, an annular lens 13' is used to replace the condenser lens 13 in FIG. 5. The LED emitters 12 in FIGS. 5 and 6 are a combination of GaAs epitaxial wafer with some molded optics, explained as follows.

Figure 7:
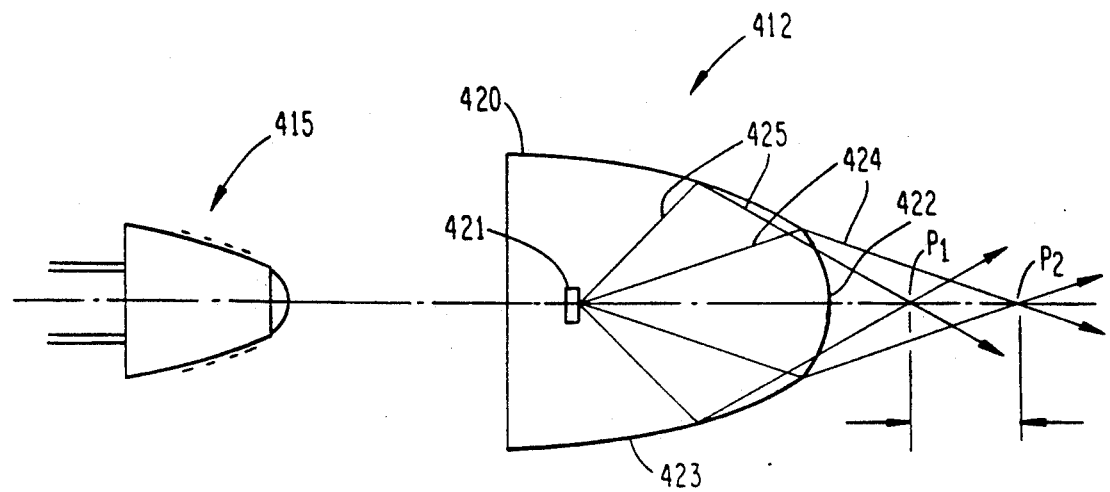
FIGS. 7 to 10 depict various structures of the emitter and optics assembly for use in the optical emitting and sensing system of FIG. 5 or FIG. 6.

FIG. 7 illustrates a first embodiment of the LED emitter and optics assembly 412; and the outward appearance threof is indicated at 415 in this figure.

The LED emitter and optics assembly 412, of FIG. 7, comprises an optical device 420, fabricated of optical plastic by injection molding, and a piece of LED wafer 421 embedded within device 420 on the axis of this device. Optical device 420 is molded to have two optical surfaces. The first optical surface is a spherical interface 422 formed on the front of optical device 420, and the second optical surface is formed by the curved sidewall 423 of the optical device 420. The curvature of the sidewall 423 is similar to that used in a light concentrator and such that the optical device 420 narrows from front to back or tapers towards the front interface surface 422.

The spherical interface 422 in front focuses the paraxial light rays 424 from LED 421 onto the point $P_2$. Light from the LED 421 passing through the off-axis region of optical device 420 hits the sidewall 423, is reflected back to the spherical interface 422 and focused by interface 422 onto the point $P_1$. The region between points $P_1$ and $P_2$ is the depth of field. The curve of sidewall 423 is designed according to the requirement for the field depth for a particular bar code reading use.

The external configuration 415 of the optics assembly 412, of FIG. 7, includes a spherical front optical interface and an internally reflective curved sidewall. A metallic coating may cover at least a portion of the curved sidewall of the exterior 415, as shown by dotted lines in the drawing.

Figure 8:
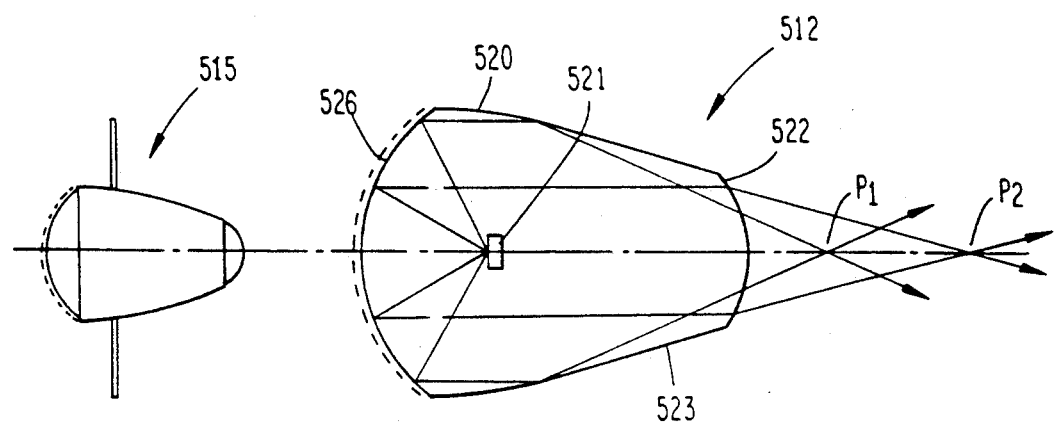

FIG. 8 illustrates a second embodiment of the LED emitter and optics assembly. The LED emitter and optics assembly 512, of FIG. 8 is generally similar to assembly 412 of FIG. 7. The assembly 512, however, includes an LED wafer 521 turned 180° to face the back of assembly 512. LED wafer 521 is located at the focal point of an internally reflective parabolic mirror 526 formed on the back surface of the optical device 520. A metallic coating may cover the exterior surface of the parabolic mirror 526, as shown by dotted line in the drawing. The parabolic mirror 526 transforms light from the LED 521 into forwardly directed parallel light. Of the parallel light, the spherical interface 522 focuses the paraxial portion onto the point $P_2$. The off-axis portion of the parallel light is first reflected by the curved sidewall 523, and then the spherical interface 522 focuses it onto point $P_1$. The region between points $P_1$ and $P_2$ is the focal depth of field. 515 on the left-hand side of FIG. 8 shows the outward appearance of the optics assembly described above.

Figure 9:
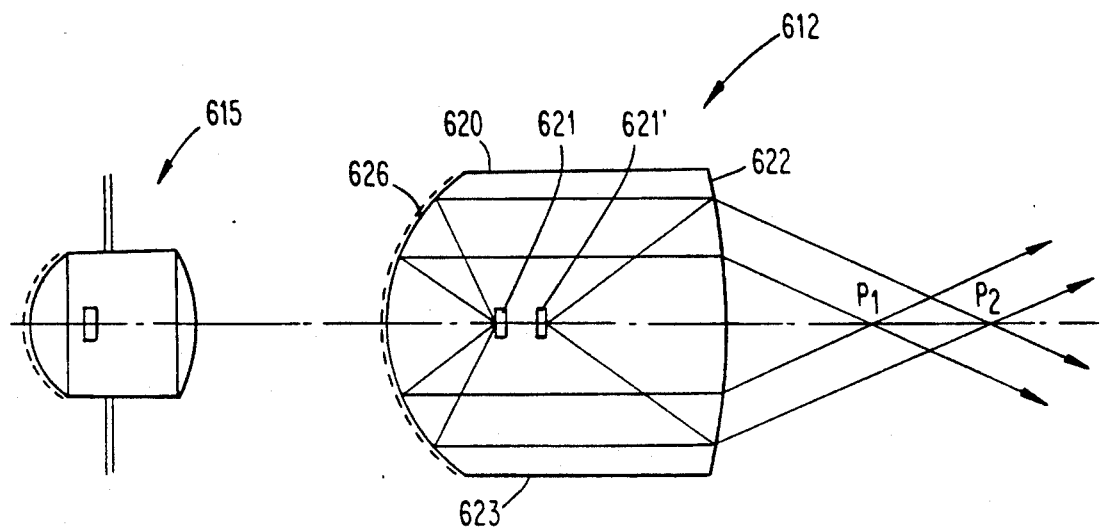

FIG. 9 illustrates a third embodiment of the LED emitter and optics assembly. The structure of assembly 612, shown in FIG. 9, is similar to the structure shown in FIG. 5; however, the sidewall 623 of the FIG. 9 embodiment is no longer curved. The sidewall 623 is cylindrical and thereby forms straight lines parallel to the axis. Also, in FIG. 9 there are two pieces of LED wafers 621 and 621' for a higher irradiance to illuminate the target. LED wafer 621 faces the back of the optical device 620 and is located on the focus of an internally reflective parabolic mirror 626 formed on the back surface of the optical device. Again, a metallic coating may cover the exterior surface of the parabolic mirror, as shown by a dotted line. The parabolic mirror 626 transforms light from the LED 621 into parallel light. LED 621' is positioned to forwardly emit light directly towards the curved interface 622 on the front of optical device 620. The curved interface 622 focuses the diverging paraxial light from forward facing LED 621' at point $P_2$. The curved interface 622 also focuses the parallel light from parabolic mirror 626 and rear facing LED 621 to a point $P_1$. Points $P_1$ and $P_2$ are at different distances from the front of the molded optical device 620, and the spacing between $P_1$ and $P_2$ is the depth of field. The outward appearance of the optics assembly described above is shown by 615 on the left-hand side of FIG. 9.

Figure 10:
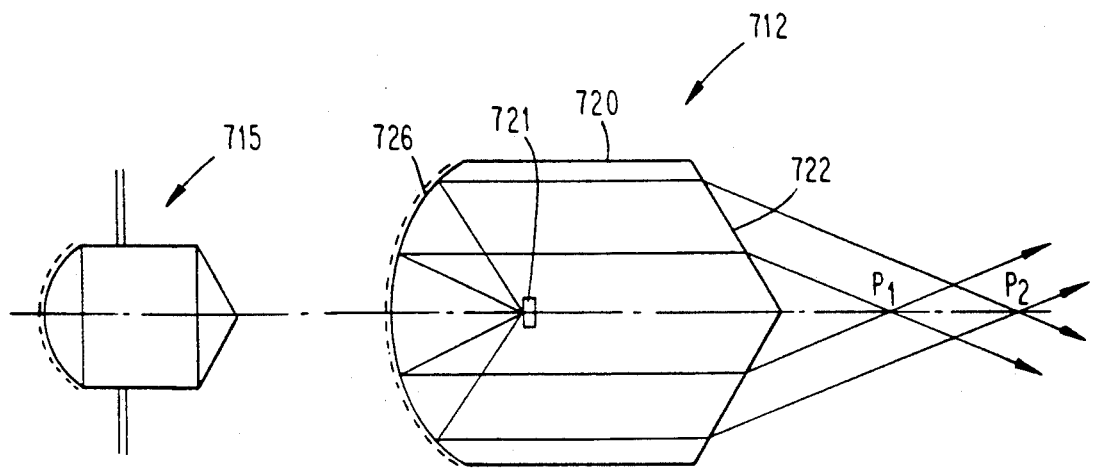

The structure shown in FIG. 10 is similar to that in FIG. 9. The difference between the two structures is that the front spherical surface 621 of the LED emitter and optics assembly 612 in FIG. 6 is changed to an axicon 722 in the LED emitter and optics assembly 712 of FIG. 10.

FIG. 10 shows a single LED wafer 721 facing the back of the optical device 720. Wafer 721 is located on the focus of a parabolic mirror 726 formed on the back surface of the optical device. Again, a metallic coating may cover the exterior surface of the parabolic mirror, as shown by a dotted line. The axicon surface 722 focuses light passing through the central portion of the optical device to a first local point $P_1$, and the axicon focuses light passing through the off-axis portion of the optical device to a second, more distant focal point $P_2$. Although shown with a single rear facing LED wafer, the LED emitter and optics assembly 712 could include a second wafer facing forward, in a manner similar to the wafer 621' shown in FIG. 9. The outward appearance of the optics assembly described above is shown by 715 on the left-hand side of FIG. 10.

To this point, the preferred embodiments have included a standard photodetector wafer, and each optical emitting and sensing system would be used in a single emitter single-detector type circuit such as that shown in FIG. 4. Another way to produce the two channels of information is to replace the single detector wafer in the photodetector and optics assemblies shown in FIGS. 5 and 6 with a wafer having two separate active sensing areas, as follows.

Figure 11:
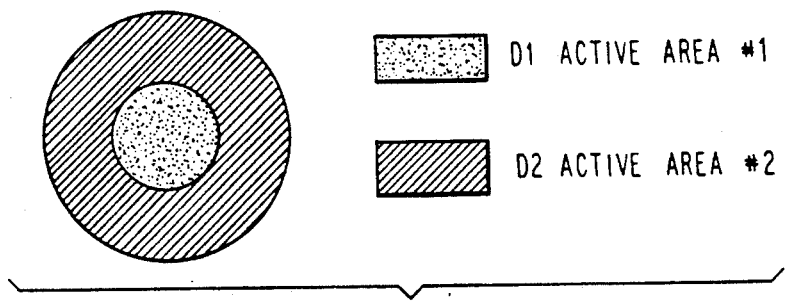
FIG. 11 is a simplified plan view of a photodetector having two active areas, one surrounding the other.

FIG. 11 is a simplified plan view of a photodetector having two active areas, one surrounding the other, with Active area #1 shown as a shaded central circle and Active area #2 shown as a cross-hatched surrounding area. The structure of the photodetector of this embodiment will be discussed in more detail below with regard to FIGS. 13 and 14. The salient feature of the photodetector is that it inherently forms a multi-channel detection system. This multi-channel photodetector comprises a first active optical sensing area on a substrate and a second active optical sensing area formed on the same substrate. The second optical sensing area is located around said first optical sensing area. Each active optical sensing area, together with the underlying substrate forms, a photodiode. The photodetector is used in the circuit embodiment of the invention shown in FIG. 12.

Figure 12:
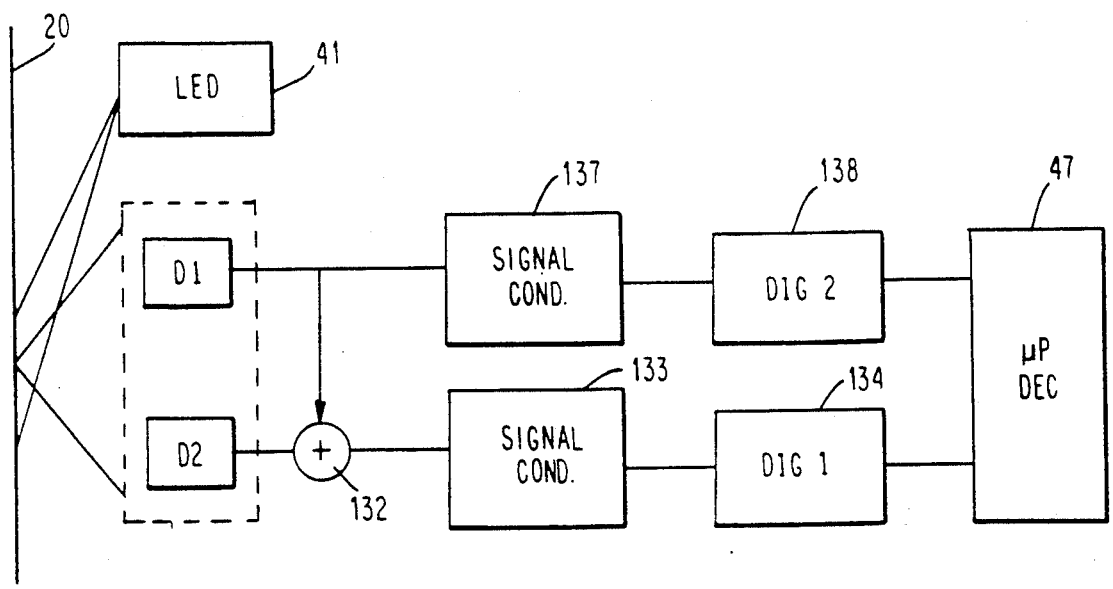
FIG. 12 shows a block circuit diagram of another embodiment of the dual channel system which uses one emitter and the two active area type photodetector of FIG. 11.

In the circuit of FIG. 12, the signal conditioning circuits and the digitizers function in a manner similar to those in the embodiments of FIG. 4. The embodiment of FIGS. 11 and 12 produces two different channels optically, based on different optical sensing properties of the two active areas D1 and D2, rather than using digitizers of different resolution, as in the embodiment of FIG. 4. FIG. 12 shows the high resolution channel, including the second digitizer, as the upper channel and the first channel as the lower channel.

In this embodiment, there is one light emitting element 41 and two photodetectors. The one light emitting element 41 would comprise any one of the emitting and optics assemblies 12, 412, 512, 612 or 712 of FIGS. 5 to 10. The photodetectors comprise the active sensing areas of the unit shown in FIG. 11 on a single wafer embedded as the semiconductor detecting type wafer within any one of the photodetector and optics assemblies 15 of FIGS. 5 and 6. In FIG. 12, D1 represents the sensor or photodetector including Active area #1, the central active area. D2 represents the sensor or photodetector including Active area #1, the surrounding active area. The LED 41 emits light to illuminate the optically encoded information. The photodetectors D1 and D2 receive light reflected from the surface of bar code 20.

Detector D1 will produce an analog signal which effectively represents the average of reflected light received over the small Active area D1. This signal would be the same as if a photodiode of a small effective area were used, and the effective area established the spot size and/or resolution of the high resolution channel.

Detector D2 will produce an analog signal which effectively represents the average of reflected light received over the larger surrounding Active area D1. The analog signals from D1 and D2 are summed by adding circuit 132. The sum of the analog signals from D1 and D2 closely approximates the signal which a larger photodiode would produce, i.e. by averaging received light over the total active area of area #1 plus area #2.

Signal conditioning circuit 133 receives the summed signal from adder 132 and conditions it as discussed above. The signal from conditioning circuit 133 is digitized by digitizer 134 to form the low resolution data stream. Detectors D1 and D2, adder 132, signal conditioning circuit 133 and first digitizer 134 thus form the low resolution first channel in this embodiment. Signal conditioning circuit 137 receives the signal from D1 and conditions it as discussed above. The signal from conditioning circuit 137 is digitized by digitizer 138 to form the high resolution data stream. Detector D1, signal conditioning circuit 137 and second digitizer 138 thus form the high resolution second channel in this embodiment. Decoder 47 receives and processes the pulse signals from digitizers 134 and 138 in the same manner as in the earlier discussed embodiments.

It would be a simple matter to increase the number of channels of different resolutions derived using the photodetector unit of FIG. 11 by adding additional surrounding areas and corresponding adders, signal conditioning circuits and digitizers.

The photodetector unit of FIG. 11 would be fabricated using relatively standard photodiode manufacturing technology. In particular, the manufacturing processes are similar to those used to build side by side photodiodes and quad four photodiode type devices. Inactive areas or dead zones between active devices typically range in size from 0.001 to 0.005 Possible layouts for the photodetector unit of FIG. 11 appear in FIGS. 13 and 14.

Figure 13:
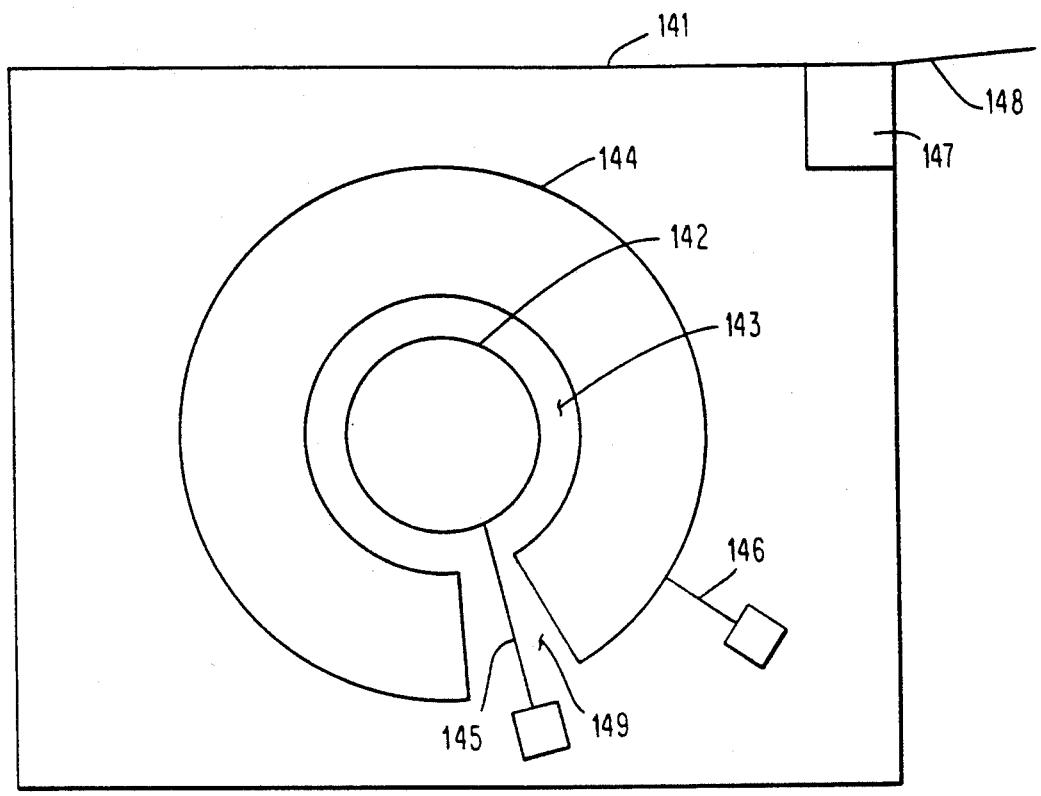
FIGS. 13 and 14 are more detailed views of specific embodiments of the photodetector of FIG. 11.

The embodiment of FIG. 13 includes a substrate 141 on which the active areas are formed. The first active area 142 is circular. The first active region 142 is formed by appropriately doping the circular region. A dead zone 143 surrounds the active area 142. The second active area 144 forms a substantially circular ring around the first active area 142 and dead zone 143. The second active region 144 is formed by appropriately doping the circular ring. The dead zone 143 separates and electrically isolates active areas 142 and 144. A common lead 148 is attached to substrate 141 by bonding pad 147. Together with the underlying substrate, each of the active regions 142 and 144 forms a photo sensitive diode.

FIG. 13 illustrates the preferred form of connection to the first active area 142. In this embodiment, the second active area 144 does not form a complete ring around the first active area 142. A small inactive area 149 forms an insulating passage through the ring formed by the second active area 144. A metal trace 145 formed on the small inactive area 149 connects the first active area to a bonding pad. Current carrying connection to the first active area can then be formed through the bonding pad and the metal trace 145. A metal trace 146 similarly connects second active area 144 to a bonding pad. Only a 2 mil wide path through the second active area 144 is lost to formation of the passage 149 and trace 145.

Figure 14:
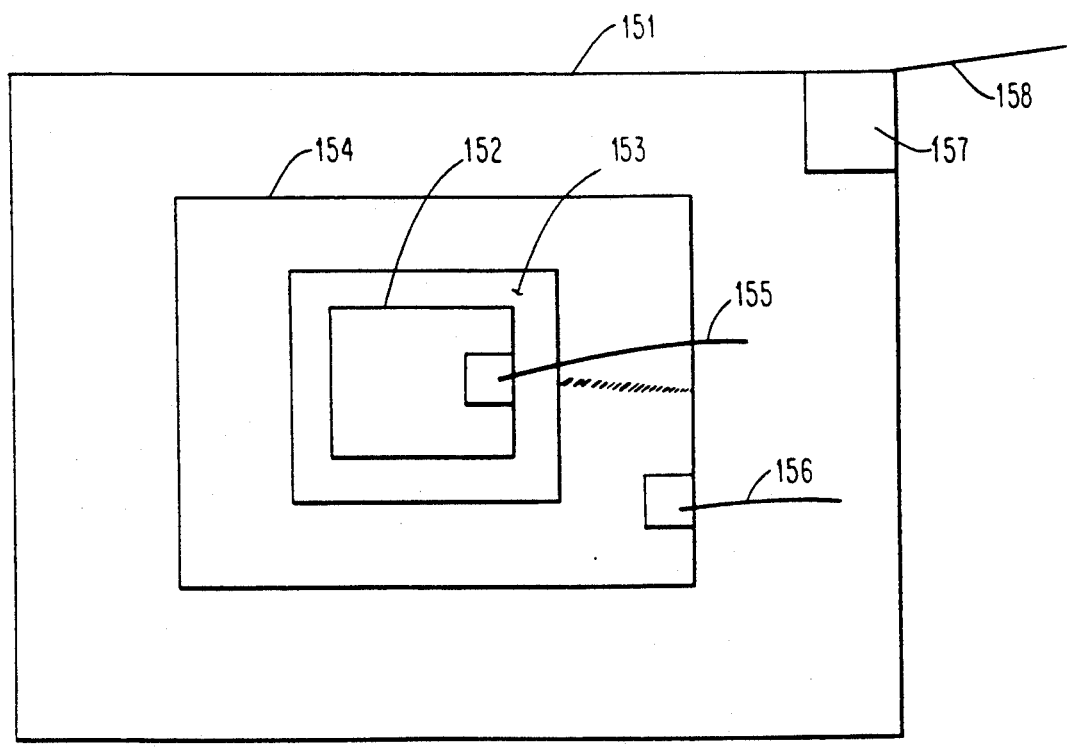

FIG. 14 illustrates a second embodiment of the inventive photodetector unit, having rectangular active areas a using a bonding pad formed directly on each of the active areas. This embodiment includes a substrate 151 on which the active areas are formed. The first active area 152 is rectangular, and the first active region 152 is formed by appropriately doping the rectangular region. A rectangular dead zone 153 is formed around the active area 152. The second rectangular active area 154 completely encloses the first active area 152 and dead zone 153. The second active region 154 is formed by appropriately doping the outer rectangular ring. The dead zone 153 separates and electrically isolates active areas 152 and 154. A common lead 158 is attached to substrate 151 by bonding pad 157. Together with the underlying substrate, each of the active regions 152 and 154 forms a photo sensitive diode.

FIG. 14 illustrates a second form of connection to the active areas. In this embodiment, a bonding pad is formed directly on each active area. A metal lead 155 provides current carrying connection to the first active area 152 through the bonding pad on that area, and a second metal lead 156 provides a similar connection through the bonding pad on the second active area 154. In each active area a portion of the area is sacrificed to formation of the bonding pads. Also, the lead 155 will cast a shadow across the second active area 154, as shown in FIG. 15.

The discussion of the improved photodetector unit of FIGS. 11 to 14 has concentrated on the preferred embodiment wherein the active areas form photodiodes on a substrate, but other active area type photodetector devices could be used. For example, it is contemplated that the photodetector unit could comprise areas within a two dimensional charge coupled device (CCD) array. The central area would comprise a number of pixel sensing units of the array, for example, in the form of a 2×2 square sub-array. The surrounding active area would comprise a number of pixel sensing units of the area around the central active area, for example, forming a 2 pixel wide ring around the square central active area. The signal from the central area would be formed by shifting out the charge value of each pixel of the 2×2 square sub-array and averaging the values over the number of pixels of the central area. The signal from the surrounding area could be formed in a similar manner, or the summation signal could be formed directly by averaging values over both areas together.

Figure 15:
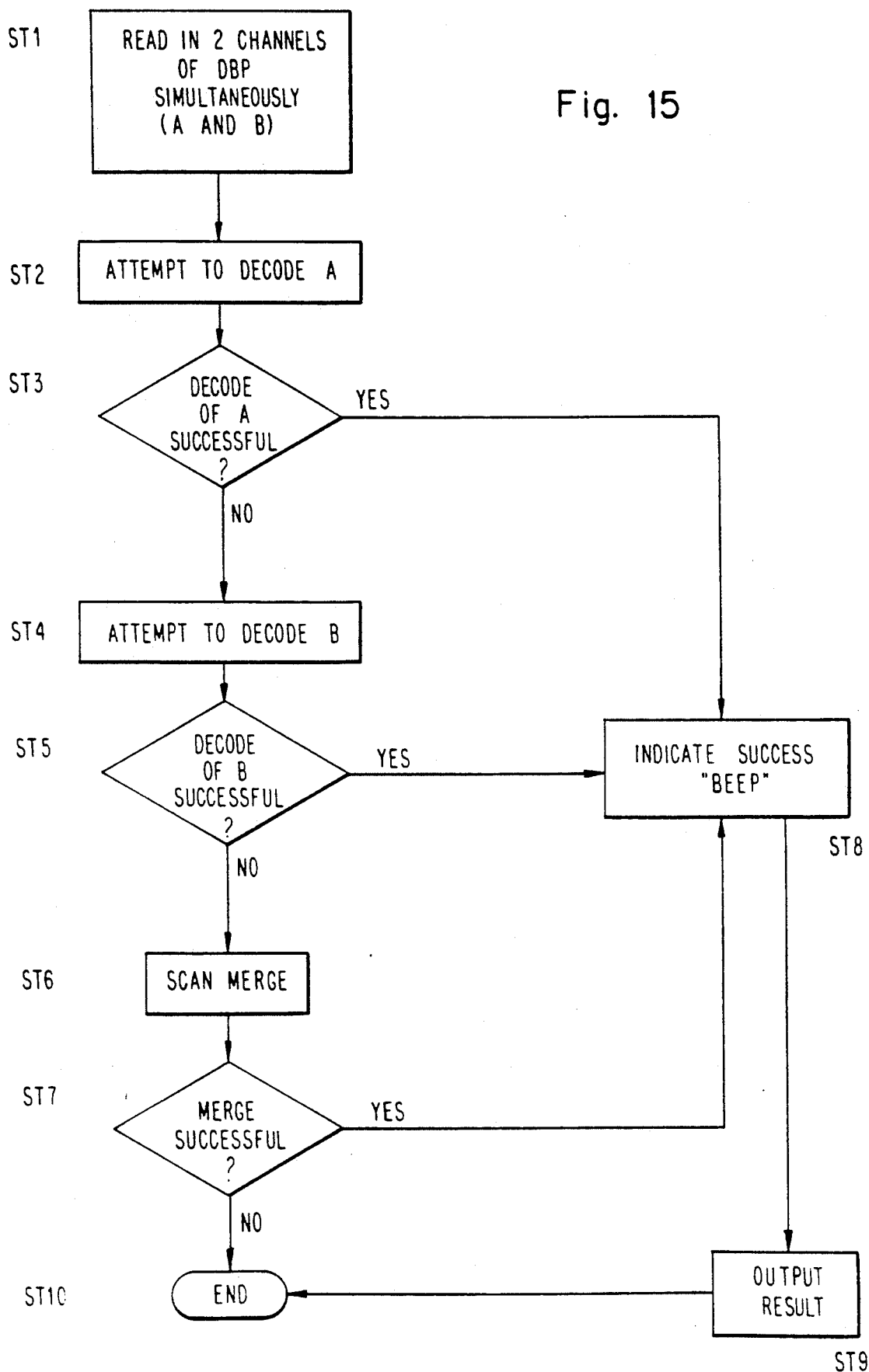
FIG. 15 is a flow chart illustrating the process by which the decoder derives a single legitimate result from the two data streams of differing resolution.

FIG. 15 is a flow chart illustrating the process by which the decoder 47 derives a single legitimate result from the two data streams of differing resolution. In first step ST1 the data from both of the channels is read into the decoder 47 simultaneously. The data from the two channels will be referred to as data A and data B. One of these data inputs arbitrarily corresponds to the low resolution data stream and the other corresponds to the high resolution data stream. In step ST2, the decoder attempts to decode data A. In step ST3 the decoder determines if the attempt to decode data A was successful. If successful, the process flow proceeds to step ST8 to provide a "beep" to indicate successful scanning followed by step ST9 which provides an output of the decoded data, and then the program ends at step ST10. If, however, step ST3 found that the attempt to decode data A was unsuccessful, the decoder proceeds to attempt to decode data B in step ST4. In step ST5 the decoder determines if the attempt to decode data B was successful. If successful, the process flow again proceeds to step ST8 to indicate successful scanning followed by step ST9 which provides the output of the decoded data, and then the program ends at step ST10. If, however, step ST5 found that the attempt to decode data B was unsuccessful, the decoder proceeds to execute a scan merge algorithm in step ST6.

Figure 16:
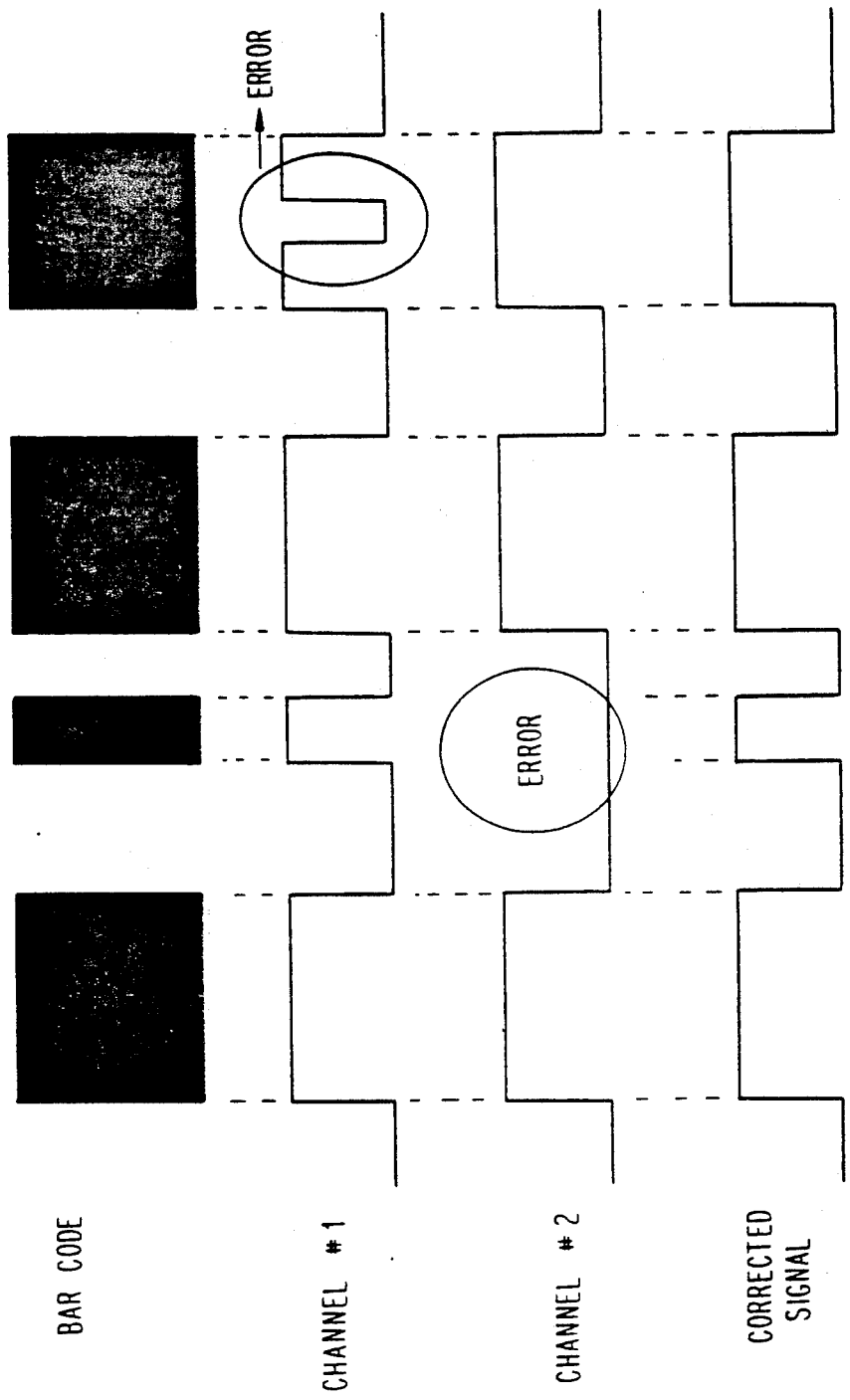
FIG. 16 illustrates an enlarged bar code and the signals derived in the two channels for processing in the scan merge algorithm portion of the process of FIG. 15.

FIG. 16 helps to illustrate the scan merge algorithm. As shown, channel #1 produces a pulse signal from its digitizer which includes one error. Several sections of the signal, however, indicate data within acceptable limits for the particular bar code standard. Similarly, channel #2 produces a pulse signal from its digitizer which includes one error and several sections of the signal which indicate data within acceptable limits. The error included in the channel #1 data is at a different position from the error in the channel #2 data. The microprocessor decoder recognizes which portions of the data from each channel are within acceptable parameters. The microprocessor decoder discards the error data from the two channels, and combines the acceptable portions of the data from the two channels to form the single final valid read result shown as the corrected signal in FIG. 16. Thus, even if both channels produce data that can not be successfully decoded, the microprocessor can merge the data from the two channels to produce a single valid result.

The scan merge algorithm is similar to the processing disclosed in commonly assigned U.S. patent application Ser. No. 07/421,269, filed Dec. 6, 1989, entitled "Method and Apparatus for Decoding Bar Codes From Multiple Scans" which is herein incorporated by reference. That prior application describes the analysis of scanning signals to determine legitimate data, for decoding and merger of data from sequential scans. The scan merge algorithm in this case is similar but adapted to process scanning data received from two different resolution channels simultaneously.

Returning to FIG. 16, after execution of the scan merge algorithm at step ST6, the decoder determines whether the scan merge produced a successful decoding. If successful, the process flow again proceeds to step ST8 to indicate successful scanning followed by step ST9 which provides the output of the decoded data, and then the program ends at step ST10. Only if the scan merge also fails to provide a legitimate successful decoded result will the program end at ST10 without an output of valid decoded data.

The above discussion of the software is simplified and limited to focus on the processing of the data from the two channels to provide the decoded result. The decoder would also include appropriate software to allow autodiscrimination of different code symbologies and to find the actual code data within an analog scanning signal which includes pulses representing light reflected from other objects.

The microprocessor decoder may also include programming for functions related to integrated terminal operations. The terminal typically would include substantial memory capacity, a keyboard, a display and some form of data interface for communication purposes. In such an integrated terminal configuration, the microprocessor would respond to keyboard input of data and commands, provide display of scanned and keyed in data and control transmission of data to external data processing systems.

The invention has been described principally as a two channel system. It is within the scope of this invention to expand the various embodiments to include additional data channels providing still further different resolutions. Alternatively, although preferred for two channel systems, the inventive optics provide particularly small efficient optics even for single channel systems.

What is claimed is:

1. An emitter and optics assembly for emitting light to illuminate optically encoded information, comprising:
a molded optical device; and
a light emitting means embedded within the molded optical device for emitting light through the molded optical device to illuminate the optically encoded information;
wherein said molded optical device comprises a refractive front surface and an internally reflective surface which cooperate to provide two different focal lengths for the emitted light.

2. An assembly as in claim 1, wherein:
said refractive front surface comprises a curved surface;
said internally reflective surface comprises an internally reflective parabolic mirror formed on the rear of said molded optical device and a reflective sidewall of said molded optical device; and
the light-emitting wafer is embedded in said molded optical device so as to emit light toward said internally reflective parabolic mirror.

3. An assembly as in claim 2, wherein said reflective sidewall tapers from the rear of said molded optical device toward said refractive front surface.

4. An assembly as in claim 1, wherein said refractive front surface comprises a curved surface and said internally reflective surface comprises a curved sidewall which tapers toward said refractive front surface.

5. An assembly as in claim 1, wherein:
said refractive front surface comprises an axicon surface;
said internally reflective surface comprises an internally reflective parabolic mirror formed on the rear of said molded optical device; and
the light-emitting means is embedded in said molded optical device so as to emit light toward said internally reflective parabolic mirror.

6. An assembly as in claim 5, wherein a sidewall of said molded optical device is cylindrical.

7. An assembly as in claim 1, wherein said refractive front surface comprises a curved surface.

8. An assembly as in claim 1, wherein said refractive front surface comprises an axicon surface.

9. An assembly as in claim 1, wherein:
said refractive front surface comprises a curved surface;
said internally reflective surface comprises an internally reflective parabolic mirror formed on the rear of said molded optical device;
the light-emitting means is embedded in said molded optical device so as to emit light toward said internally reflective parabolic mirror; and
said assembly further comprises a second light-emitting means embedded in said molded optical device so as to emit light toward the refractive front surface.

10. An assembly as in claim 9, wherein a sidewall of said molded optical device is cylindrical.

11. An assembly as in claim 1, wherein said molded optical device comprises an injection molded plastic.

12. An optical emitting and sensing system, for emitting light to illuminate optically encoded information and sensing light reflected from the optically encoded information, said system comprising:

a molded optical device having a refractive front surface and an internally reflective surface;

emitter means, embedded within the molded optical device, for emitting light, wherein:

(i) the refractive front surface focuses a paraxial portion of the emitted light onto a first focal point, and the refractive front surface focuses an off-axis portion of the emitted light onto a second focal point, and (ii) the first and second focal points are different distances from the front surface of the molded optical device; and a photodetector for detecting light reflected from the optically encoded information.

13. A system as in claim 12, wherein:

the emitter means consist of a single light emitter facing the refractive front surface and emitting diverging light in a generally forward direction, and the internally reflective surface comprises a curved sidewall of the molded optical device, said curved sidewall forming a curved taper towards the front of the molded optical device such that the off-axis portion of emitted light reflects off of the curved sidewall surface being passing through the refractive front surface.

14. A system as in claim 13, wherein the refractive front surface of the molded optical device is curved.

15. A system as in claim 14, wherein the refractive front surface of the molded optical device is spherical.

16. A system as in claim 12, wherein:

the emitter means comprises at least one light emitter facing away from the refractive front surface, and the internally reflective surface comprises a parabolic mirror formed on a rear surface of the molded optical device, said parabolic mirror converting diverging light emitted by the first light emitter into forwardly directed parallel light.

17. A system as in claim 16, wherein the refractive front surface of the molded optical device is curved.

18. A system as in claim 17, wherein the refractive front surface of the molded optical device is spherical.

19. A system as in claim 16, wherein the refractive front surface of the molded optical device comprises an axicon.

20. A system as in claim 16, wherein a sidewall of said molded optical device is cylindrical.

21. A system as in claim 16, wherein the emitter means further comprises a second light emitter facing the refractive front surface and emitting light in a forward direction.

22. A system as in claim 12, wherein the molded optical device, the emitter means and the photodetector are aligned along a common optical axis.

23. A system as in claim 22 further comprising an aperture located between the assembly formed by the emitter and the molded optical device and the photodetector; and a lens for focusing the light reflected from the optically encoded information onto the aperture, wherein the aperture and lens are aligned along the common optical axis.

24. A system as in claim 23 wherein the lens is located between the assembly and the aperture.

25. A system as in claim 12 wherein the lens is concentric about the assembly.

26. A system as in claim 12, wherein the photodetector is a light detecting semiconductor device comprising:

a first active optical sensing area formed on said means; and a second active optical sensing area formed on said means such that said second optical sensing area is located around said first optical sensing area.

27. A system as in claim 26, wherein said second optical sensing area substantially surrounds said first optical sensing area.

28. A system as in claim 27, wherein said first optical sensing area is centered inside said second optical sensing area.

29. A system as in claim 26, wherein said first optical sensing area and said second optical sensing area each comprise a photodiode.

30. A system for reading optically encoded information comprising:

an emitting and optics assembly comprising:

(i) a molded optical device having a refractive front surface and an internally reflective surface which cooperate to provide two focal lengths, and (ii) emitter means embedded within the molded optical device for emitting light;

a photodetector for optically sensing the encoded information and in response thereto producing at least one electrical signal corresponding to the sensed optically encoded information;

means responsive to said at least one electrical signal for deriving two channels of data for each scan or pass of the encoded information by the photodetector and optics assembly, the two channels of data having respectively two different resolutions, one being higher than the other; and a decoder responsive to both channels of derived data for producing a single data output representative of the sensed optically encoded information.

31. A system for reading optically encoded information as in claim 30, wherein:

said means for deriving two channels of data comprise two digitizers, and said two digitizers are both responsive to a common electrical signal from said photodetector and optics assembly, but said two digitizers have respectively different threshold levels to establish the two different resolutions.

32. A system for reading optically encoded information as in claim 30, wherein the refractive front surface of the molded optical device comprises a curved surface.

33. A system for reading optically encoded information as in claim 32, wherein the refractive front surface of the molded optical device comprises a spherical surface.

34. A system for reading optically encoded information as in claim 30, wherein:

the emitter means comprises at least one light emitter facing away from the refractive front surface, and the internally reflective surface comprises a parabolic mirror formed on a rear surface of the molded optical device, said parabolic mirror converting diverging light emitted by the first light emitter into forwardly directed parallel light.

35. A system for reading optically encoded information as in claim 34, wherein the refractive front surface of the molded optical device is curved.

36. A system for reading optically encoded information as in claim 35, wherein the refractive front surface of the molded optical device is spherical.

37. A system for reading optically encoded information as in claim 34, wherein the refractive front surface of the molded optical device comprises an axicon.

38. A system for reading optically encoded information as in claim 34, wherein a sidewall of said molded optical devices is cylindrical.

39. A system for reading optically encoded information as in claim 34, wherein the emitter means further comprises a second light emitter facing the refractive front surface and emitting light in a forward direction.

40. A system as in claim 30, wherein said photodetector comprises a light detecting semiconductor means having a first active optical sensing area on said semiconductor means and a second active optical sensing area formed on said semiconductor means such that said second optical sensing area is located around said first optical sensing area.

41. A system for reading optically encoded information as in claim 40, wherein the means for deriving two channels of data comprise:

means for digitizing a signal derived from the first optical sensing area to form the higher resolution data channel;

means for summing the signal derived from the first optical sensing area and a signal derived from the second optical sensing area; and means for digitizing the output of the summing means to form the lower resolution data channel.

42. A system for reading optically encoded information as in claim 40, wherein the molded optical device comprises an injection molded plastic.

43. An optical emitting and sensing system, for emitting light to illuminate optically encoded information and sensing light reflected from the optically encoded information, said system comprising:

a molded optical device having a refractive front surface and an internally reflective surface;

emitter means, embedded within the molded optical device, for emitting light, wherein:
  (i) the molded optical device focuses a paraxial portion of the emitted light onto a first focal point and focuses an off-axis portion of the emitted light onto a second focal point, and
  (ii) the first and second focal points are different distances from the front surface of the molded optical device; and a photodetector for detecting light reflected from the optically encoded information.

* * * * *